United States Patent
Pinkerton, Sr.

(10) Patent No.: US 12,377,360 B2
(45) Date of Patent: Aug. 5, 2025

(54) TOY VEHICLE WITH A BURNOUT FUNCTION

(71) Applicant: Darrell Pinkerton, Sr., Martinsville, IN (US)

(72) Inventor: Darrell Pinkerton, Sr., Martinsville, IN (US)

( * ) Notice: Subject to any disclaimer, the term of this patent is extended or adjusted under 35 U.S.C. 154(b) by 186 days.

(21) Appl. No.: 18/368,360

(22) Filed: Sep. 14, 2023

(65) Prior Publication Data

US 2025/0090969 A1   Mar. 20, 2025

(51) Int. Cl.
| | | |
|---|---|---|
| *A63H 17/26* | (2006.01) | |
| *A63H 17/28* | (2006.01) | |
| *A63H 30/04* | (2006.01) | |
| *A63H 33/28* | (2006.01) | |
| *H02J 7/00* | (2006.01) | |

(52) U.S. Cl.
CPC ......... *A63H 17/262* (2013.01); *A63H 17/268* (2013.01); *A63H 17/28* (2013.01); *A63H 30/04* (2013.01); *A63H 33/28* (2013.01); *H02J 7/0042* (2013.01)

(58) Field of Classification Search
CPC .... A63H 17/262; A63H 17/268; A63H 17/28; A63H 30/04; A63H 33/28
USPC ........................................................ 446/25
See application file for complete search history.

(56) References Cited

U.S. PATENT DOCUMENTS

| | | | |
|---|---|---|---|
| 4,260,041 A | | 4/1981 | Mabuchi |
| 5,361,705 A | * | 11/1994 | Powell ..................... A63F 9/143 |
| | | | 446/25 |
| 5,512,001 A | | 4/1996 | Kent |
| 6,152,298 A | | 11/2000 | Dods |
| 6,620,022 B1 | * | 9/2003 | Smith .................. A63H 17/262 |
| | | | 446/457 |
| 7,097,532 B1 | * | 8/2006 | Rolicki .................. A63H 17/28 |
| | | | 446/175 |
| 7,793,789 B2 | | 9/2010 | Psaradellis |
| D672,166 S | | 12/2012 | Newman |
| 8,491,351 B2 | | 7/2013 | Trzecieski |
| 2007/0191082 A1 | | 8/2007 | Stearns |
| 2010/0009591 A1 | * | 1/2010 | Trzecieski ............. A63H 17/26 |
| | | | 446/25 |

FOREIGN PATENT DOCUMENTS

GB   2477862   8/2011

* cited by examiner

*Primary Examiner* — Joshua D Huson (57) ABSTRACT

A toy vehicle apparatus for performing a burnout function includes a burnout panel mounted to a base. A vehicle model having a rotatable wheel is mounted to the base with the rotatable wheel lying on the burnout panel, which comprises an abrasive material. The vehicle model comprises a wheel motor for rotating the rotatable wheel with respect to a body of the vehicle model such that the rotatable wheel abrades against the burnout panel. The rotatable wheel comprises an abradable material such that particulates of the abradable material are emitted from the rotatable wheel when the rotatable wheel is abraded against the burnout panel. The particulates simulate or generate smoke similar to that generated in a burnout performed with a road vehicle.

19 Claims, 13 Drawing Sheets

TOY VEHICLE WITH A BURNOUT FUNCTION

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to toy vehicles and more particularly pertains to a new toy vehicle for performing a burnout function.

(2) Description of Related Art Including Information Disclosed Under 37 CFR 1.97 and 1.98

The prior art describes toy vehicles which emit a simulated smoke. U.S. Pat. No. 8,491,351 particularly describes a toy vehicle which emits a simulated smoke near rear wheels of the toy vehicle to simulate a burnout performed by the toy vehicle. However, the prior art fails to disclose such a toy vehicle which is operable to rotate wheels of the toy vehicle to emit particulates which simulate or generate smoke when the wheels abrade against an abrasive panel to depict a burnout similar to those performed with road vehicles.

(h) BRIEF SUMMARY OF THE INVENTION

An embodiment of the disclosure meets the needs presented above by generally comprising a base and a burnout panel mounted to a top surface of the base, wherein the burnout panel comprises an abrasive material. A vehicle model is mounted over the base and comprises a body, a wheel, and a wheel motor. The wheel is mounted to a bottom of the body and is rotatable with respect to the body. The wheel lies on the burnout panel. The wheel motor is operatively coupled to the wheel and is operable to rotate the wheel with respect to the body such that an outer surface of the wheel is abraded against the burnout panel. The wheel comprises an abradable material such that particulates of the abradable material are urged away from the wheel when the wheel motor causes the wheel to abrade against the burnout panel. A processor is mounted in the base and is operatively coupled to the wheel motor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

With reference now to the drawings, and in particular to FIGS. 1 through 13 thereof, a new toy vehicle embodying the principles and concepts of an embodiment of the disclosure and generally designated by the reference numeral 10 will be described.

As best illustrated in FIGS. 1 through 13, the toy vehicle apparatus 10 generally comprises a base 12 and a burnout panel 16 mounted to a top surface 14 of the base 12. The burnout panel 16 comprises an abrasive material, and an upper surface 18 of the burnout panel 16 has a visual appearance such that the burnout panel 16 simulates a pavement material such as concrete, asphalt, or the like. In some embodiments, the burnout panel 16 may comprise the pavement material. The burnout panel 16 is removable from the base 12 and in some embodiments may be adhered to the base 12 via an adhesive 20. The burnout panel 16 also may be connected to the base 12 via a friction fit, a threaded fastener, a clamp, or other releasable fastening means. The burnout panel 16 also may be positioned in a recess in the top surface 14 of the base 12.

A vehicle model 22 is mounted over the base 12. The vehicle model 22 comprises a body 24, a pair of front wheels 26, a pair of rear wheels 28, and a wheel motor 32. The pair of front wheels 26 and the pair of rear wheels 28 are mounted to a bottom 30 of the body 24. The rear wheels 28 are rotatable with respect to the body 24 and lie on the burnout panel 16. The front wheels 26 may also be rotatable with respect to the body 24. The wheel motor 32 is operatively coupled to the pair of rear wheels 28 and is operable to rotate the pair of rear wheels 28 with respect to the body 24 such that an outer surface 34 of each rear wheel 28 of the pair of rear wheels 28 is abraded against the burnout panel 16. The rear wheels 28 comprise an abradable material such that particulates of the abradable material are urged away from the pair of rear wheels 28 when the wheel motor 32 causes the pair of rear wheels 28 to abrade against the burnout panel 16. The abradable material comprises rubber but may comprise silicone, other polymers, or the like. In some cases, the rear wheels 28 may also comprise pigmented material or substances which exhibit colors upon the abrasion caused by operation of the wheel motor 32 as described. The substances may exhibit the colors, for example, due to heating or a combustion reaction which results from the abrasion.

The vehicle model 22 further comprises a plurality of light sources 36 that are mounted to the body 24. Each light source 36 of the plurality of light sources 36 is positioned on an associated one of a front side 38 and a rear side 40 of the body 24 and simulates headlights and taillights respectively for a vehicle. The plurality of light sources 36 may include additional light sources 36 positioned elsewhere on or around the body 24 of the vehicle model 22 and may simulate interior lights of a vehicle, emergency vehicle lighting, or the like. The body 24 may be formed in any of a variety of shapes and may simulate a particular racing vehicle, a particular model of a production vehicle, or the like.

The vehicle model 22 further comprises an axle 42 is mounted to the body 24 which couples the rear wheels 28 to the body 24. The rear wheels 28 are removably coupled to the axle 42 via a pair of connectors 44 and a pair of retaining caps 46. Each connector 44 of the pair of connectors 44 is positioned between the associated rear wheel 28 and the axle 42, engaging the associated rear wheel 28 and the axle 42 via a friction fit. Each retaining cap 46 of the pair of retaining caps 46 is removably mounted around the axle 42 near an associated end of a pair of ends of the axle 42, obstructing an associated rear wheel 28 of the pair of rear wheels 28 from being moved off of the axle 42 past the associated end of the axle 42.

The vehicle model 22 may be removable from the base 12, and individual components of the vehicle model 22 may be removable from each other. For example, in some embodiments, the wheel motor 32 is fixedly attached to the base 12 and the body 24 is removably couplable to the wheel motor 32. In such embodiments, different bodies may be interchangeably installed onto the base 12 via the wheel motor 32.

A processor 48 is mounted in the base 12 and is operatively coupled to the wheel motor 32. The processor 48 is also operatively coupled to the plurality of light sources 36. A speaker 50 is operatively coupled to the processor 48 and is mounted to the base 12. A pair of motion sensors 52 is operatively coupled to the processor 48 and is mounted to the base 12. The motion sensors 52 are configured to detect motion and face in directions perpendicular to each other. The processor 48 is programmed to activate the wheel motor 32 when one motion sensor 52 of the pair of motion sensors 52 detects motion.

An input 53 is operatively coupled to the processor 48 and is mounted to the base 12. The input 53 is actuatable to activate the wheel motor 32, alternately activate and deactivate the pair of motion sensors 52, and alternately activate and deactivate the processor 48. A transceiver 54 is operatively coupled to the processor 48 and is configured to be in wireless communication with a remote electronic device 56 such that the processor 48 is operable by the remote electronic device 56. A power supply 58 is electrically coupled to the processor 48 and comprises a battery 60. A charging port 62 is mounted to the base 12 and is electrically coupled to the battery 60. The charging port 62 is configured to couple to an external power source via a power cord to charge the battery 60.

Referring to FIGS. 1 through 9, a first embodiment 64 of the toy vehicle apparatus 10 is depicted in which the burnout panel 16 comprises a pair of spaced portions 70 and each rear wheel 28 of the pair of rear wheels 28 lies on an associated spaced portion 70 of the pair of spaced portions 70. The body 24 of the vehicle model 22 in the first embodiment 64 may remain stationary with respect to the base 12 when the wheel motor 32 is operated.

Figure 1:
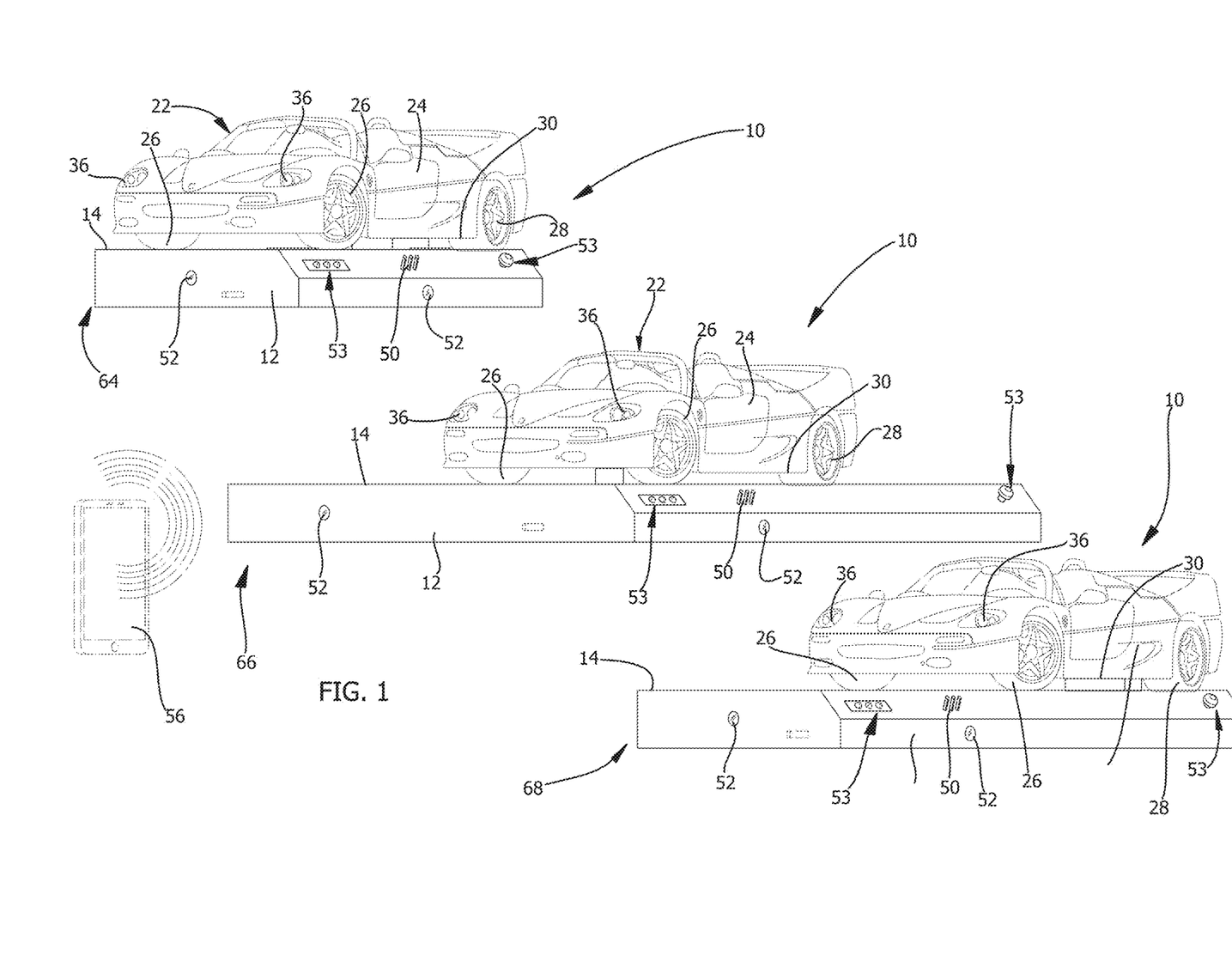
FIG. 1 is a front side perspective view of a toy vehicle apparatus according to an embodiment of the disclosure depicted in multiple embodiments.
Figure 2:
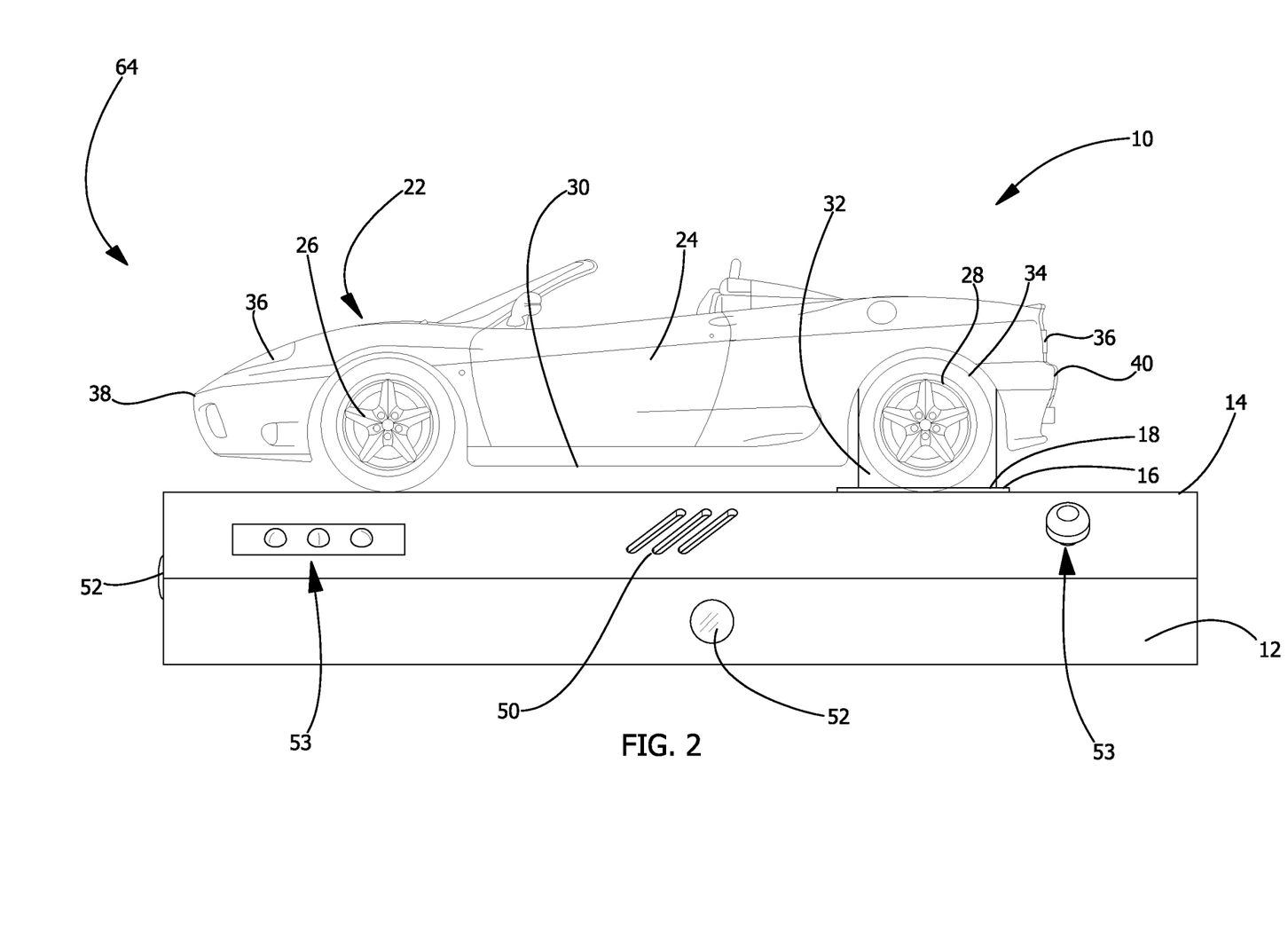
FIG. 2 is a side view of an embodiment of the disclosure.
Figure 3:
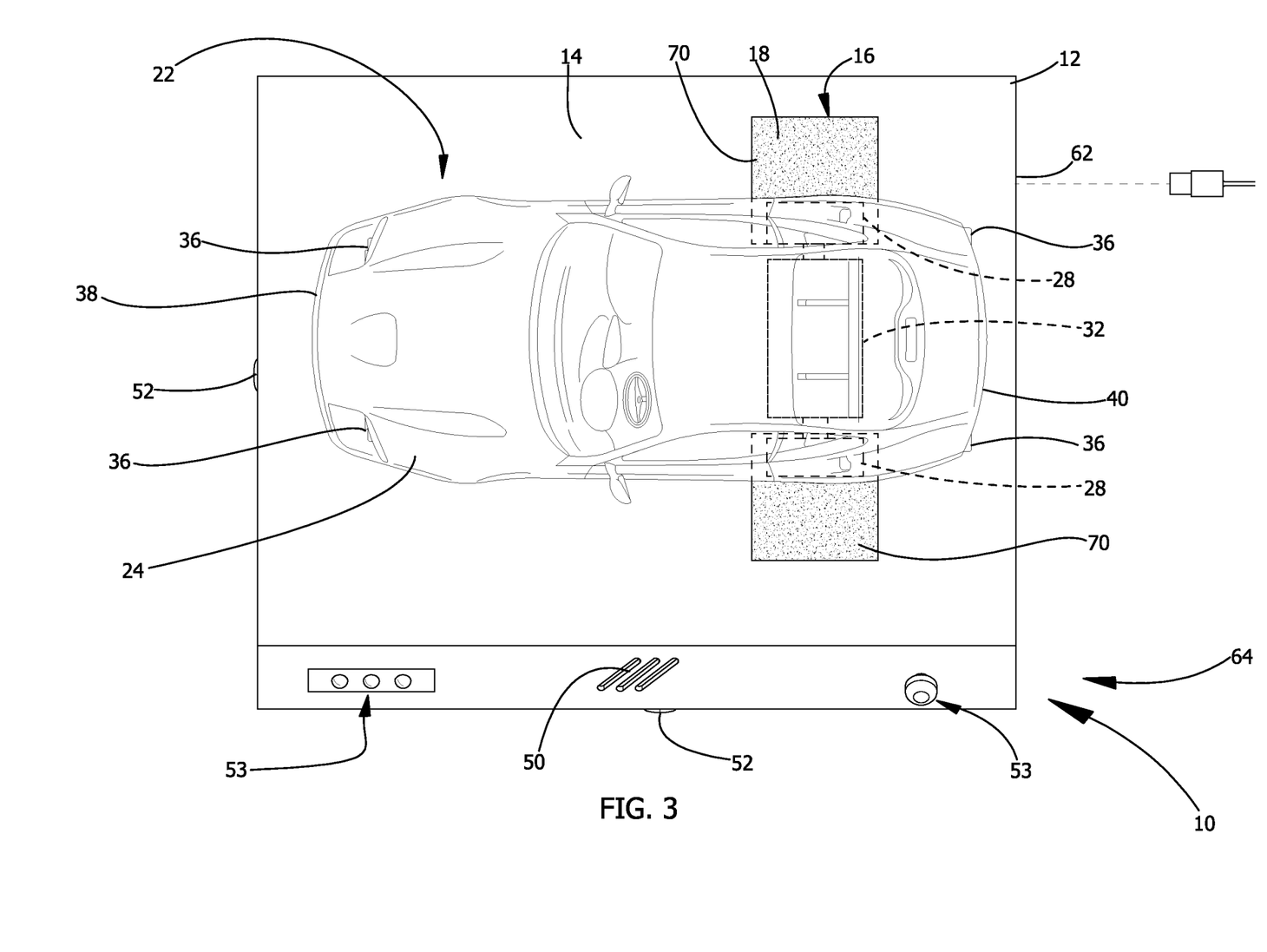
FIG. 3 is a top view of an embodiment of the disclosure.
Figure 4:
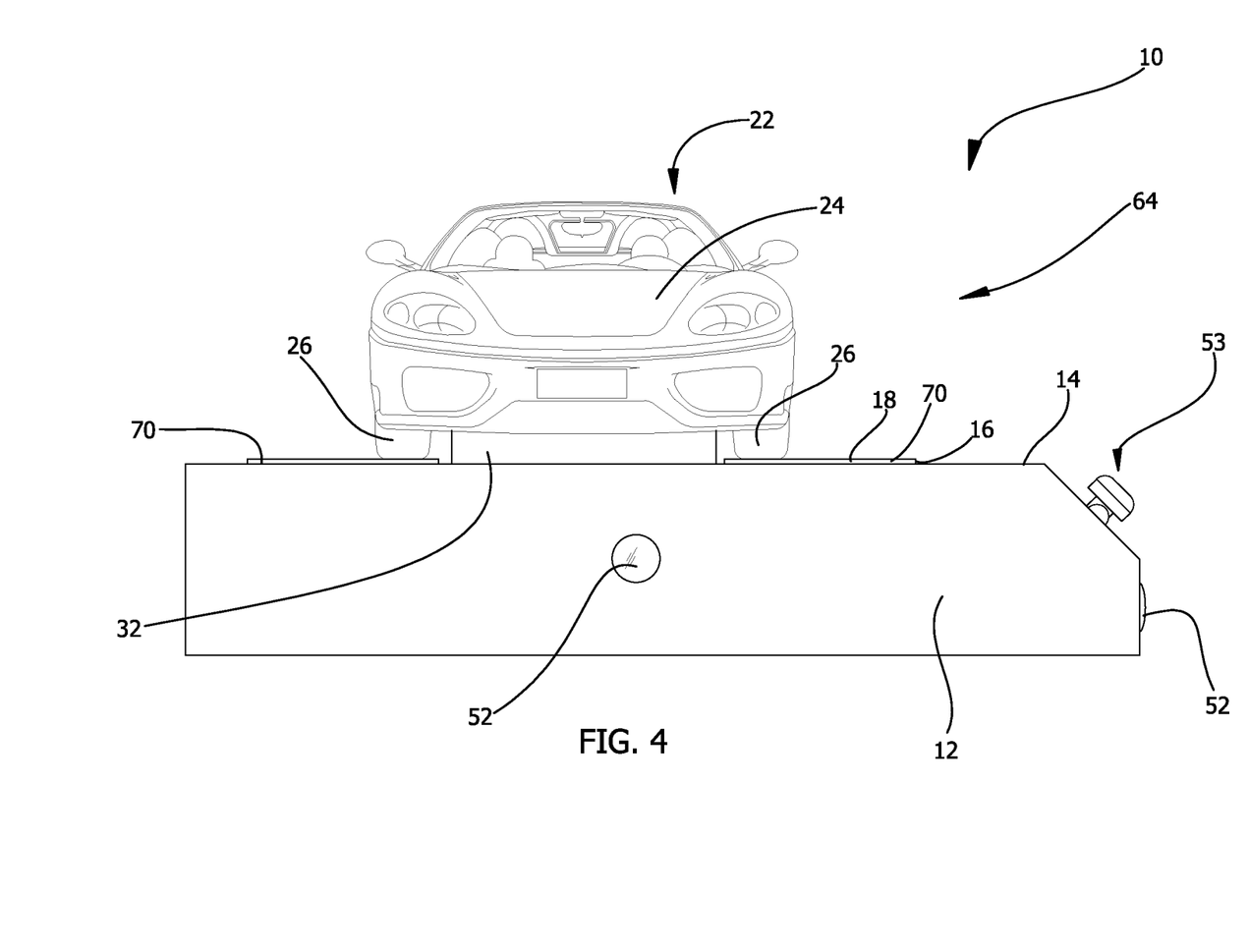
FIG. 4 is a front view of an embodiment of the disclosure.
Figure 5:
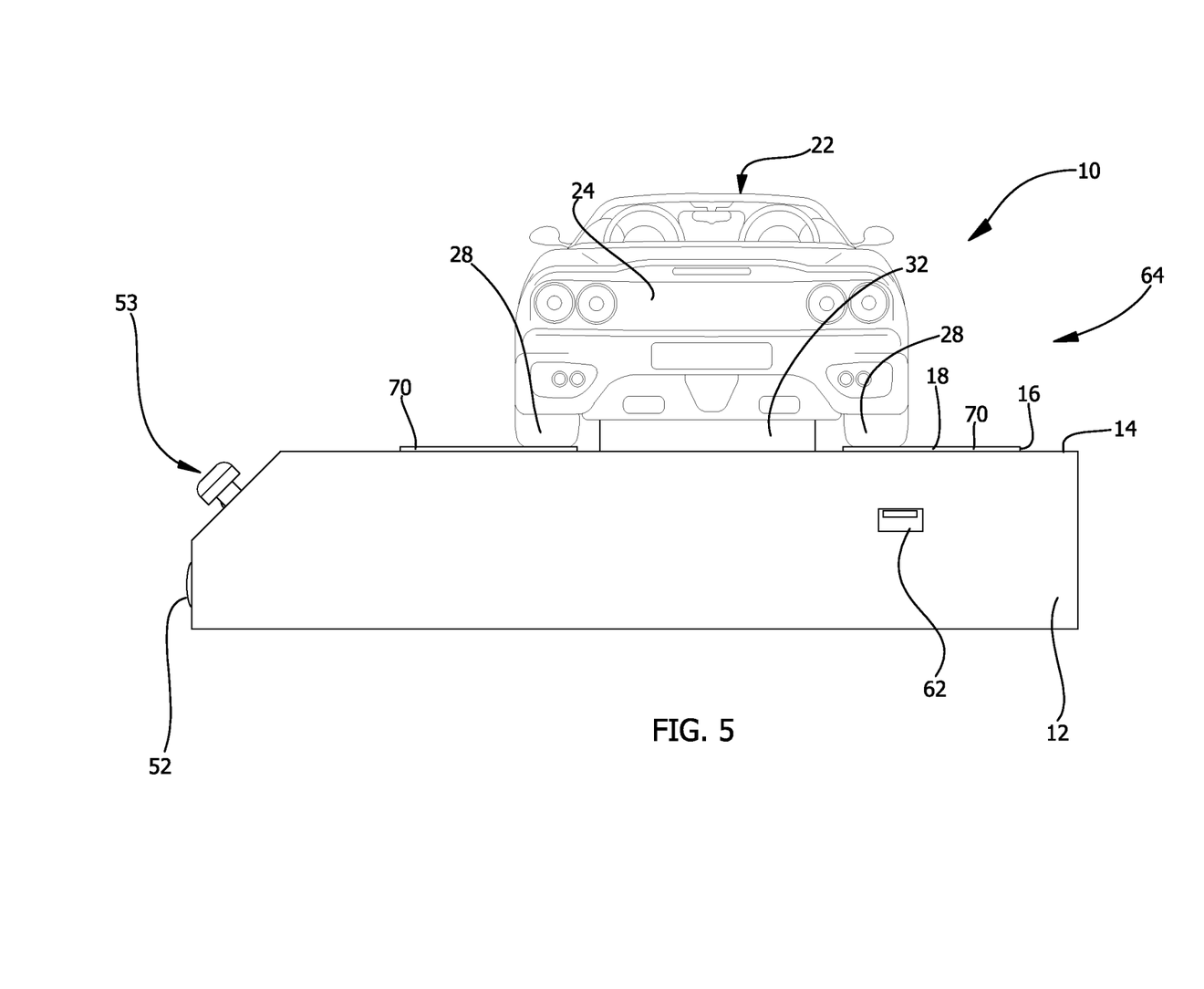
FIG. 5 is a rear view of an embodiment of the disclosure.
Figure 6:
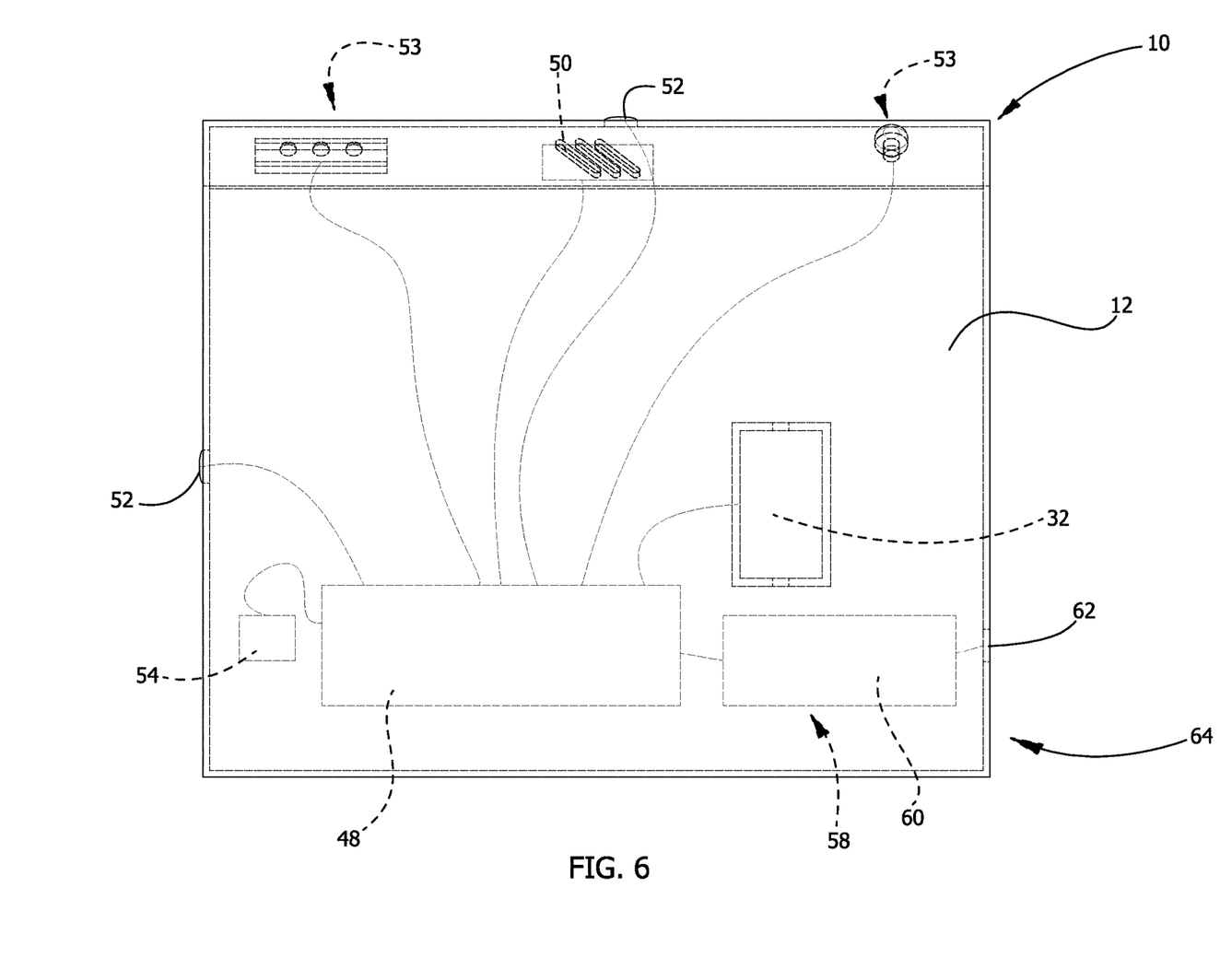
FIG. 6 is a bottom view of an embodiment of the disclosure.
Figure 7:
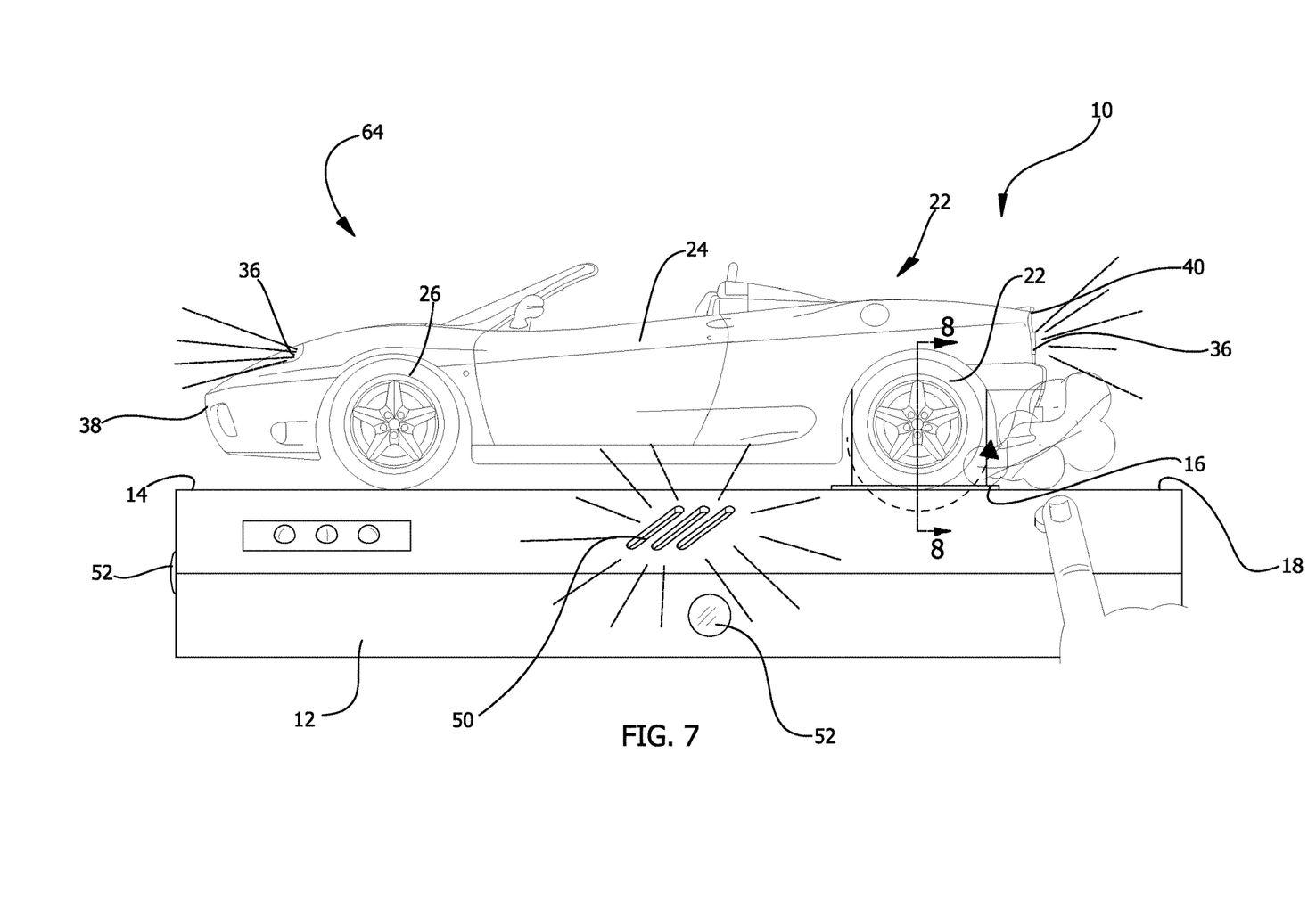
FIG. 7 is an in-use view of an embodiment of the disclosure.
Figure 8:
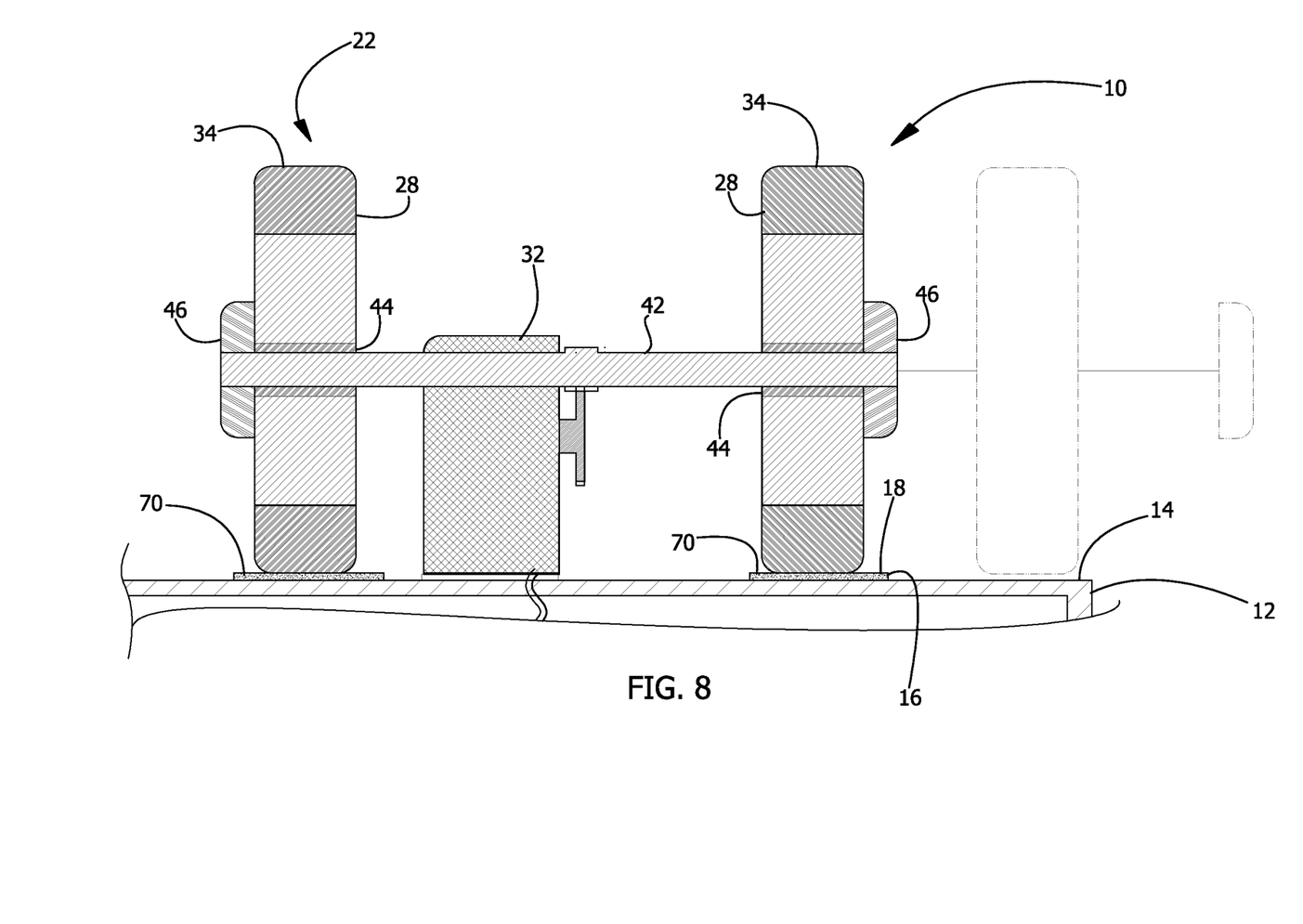
FIG. 8 is a cross section view of an embodiment of the disclosure taken from Arrows 8-8 in FIG. 7.
Figure 9:
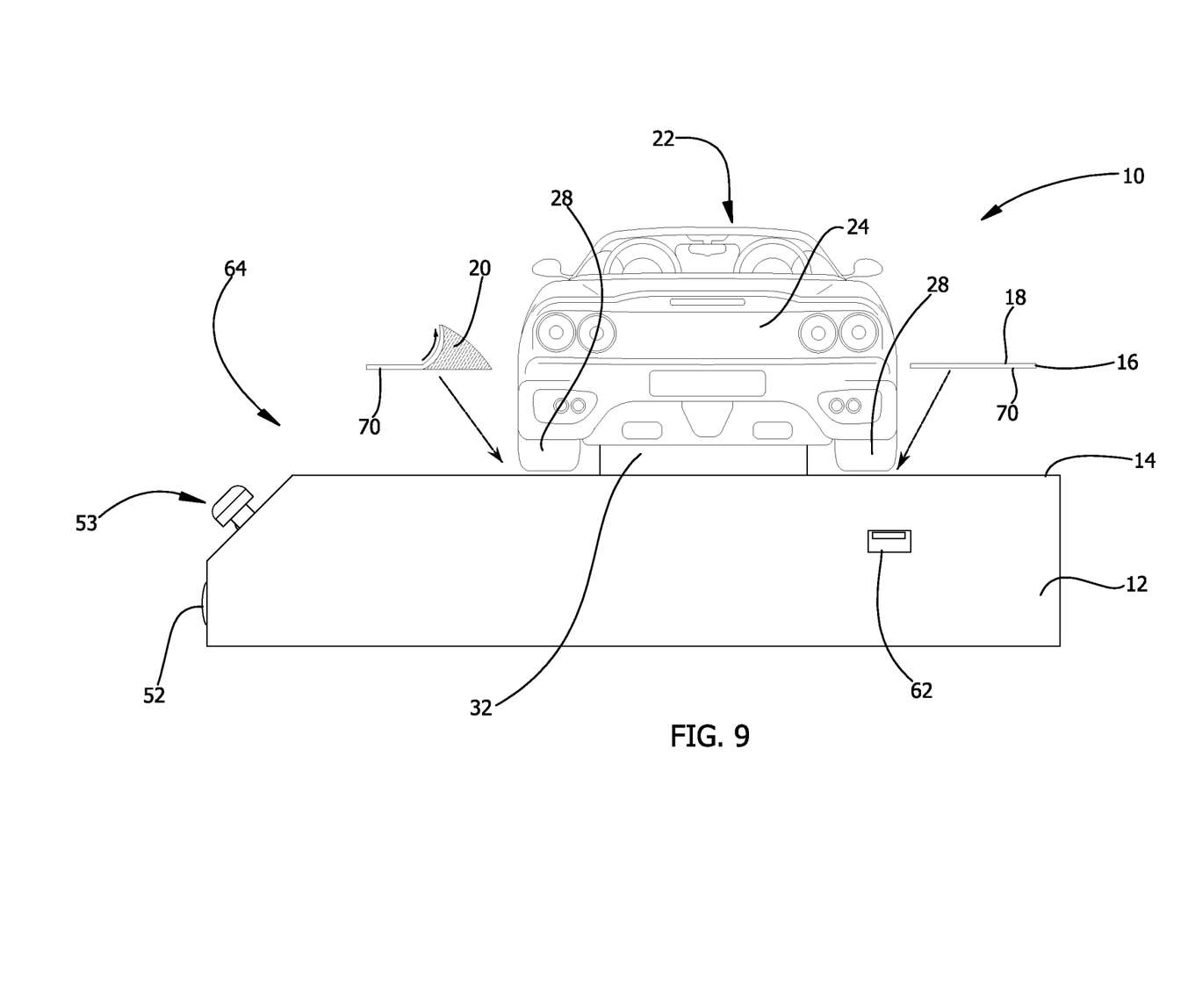
FIG. 9 is a rear exploded view of an embodiment of the disclosure.
Figure 10:
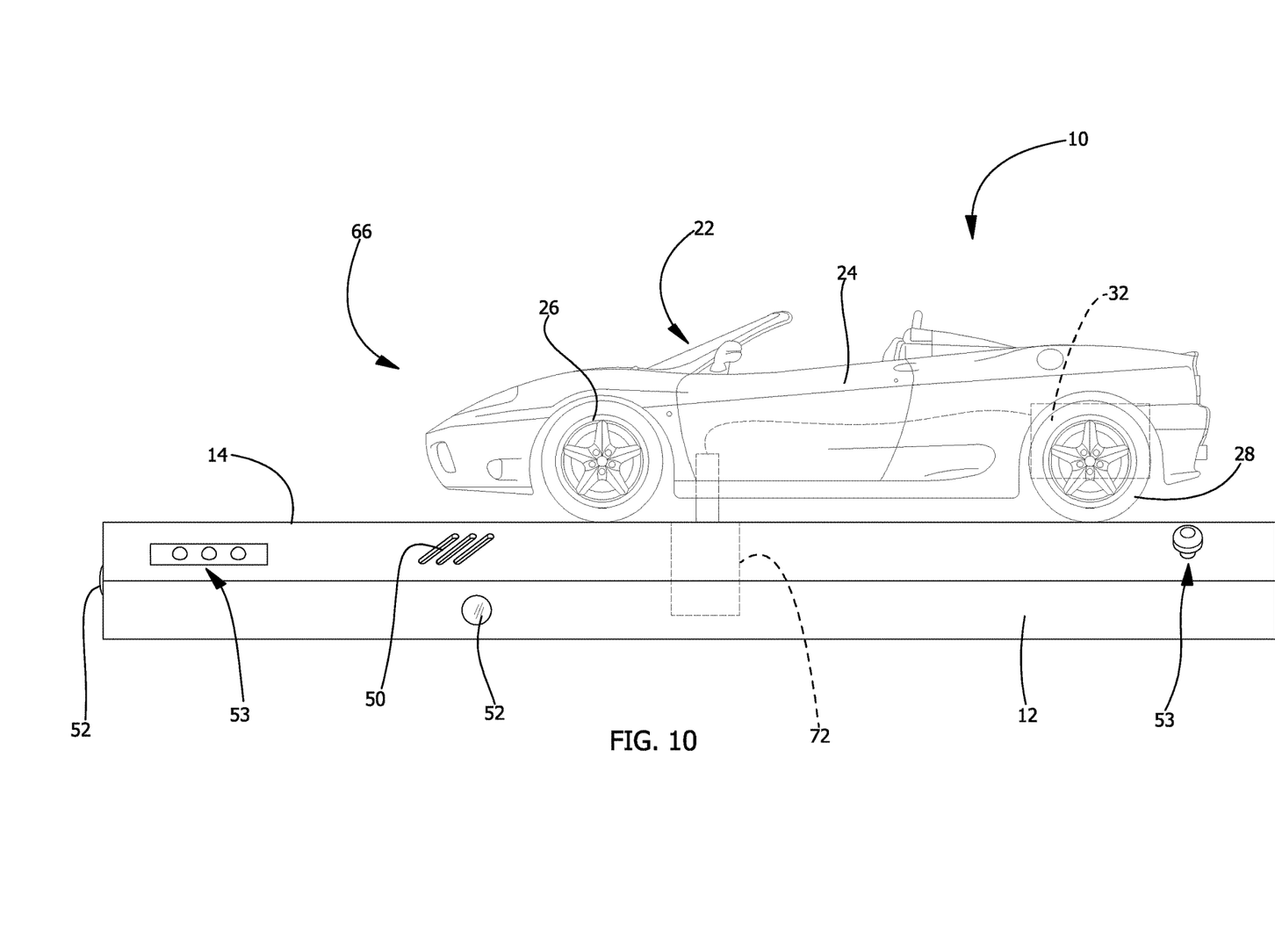
FIG. 10 is a side view of an embodiment of the disclosure.
Figure 11:
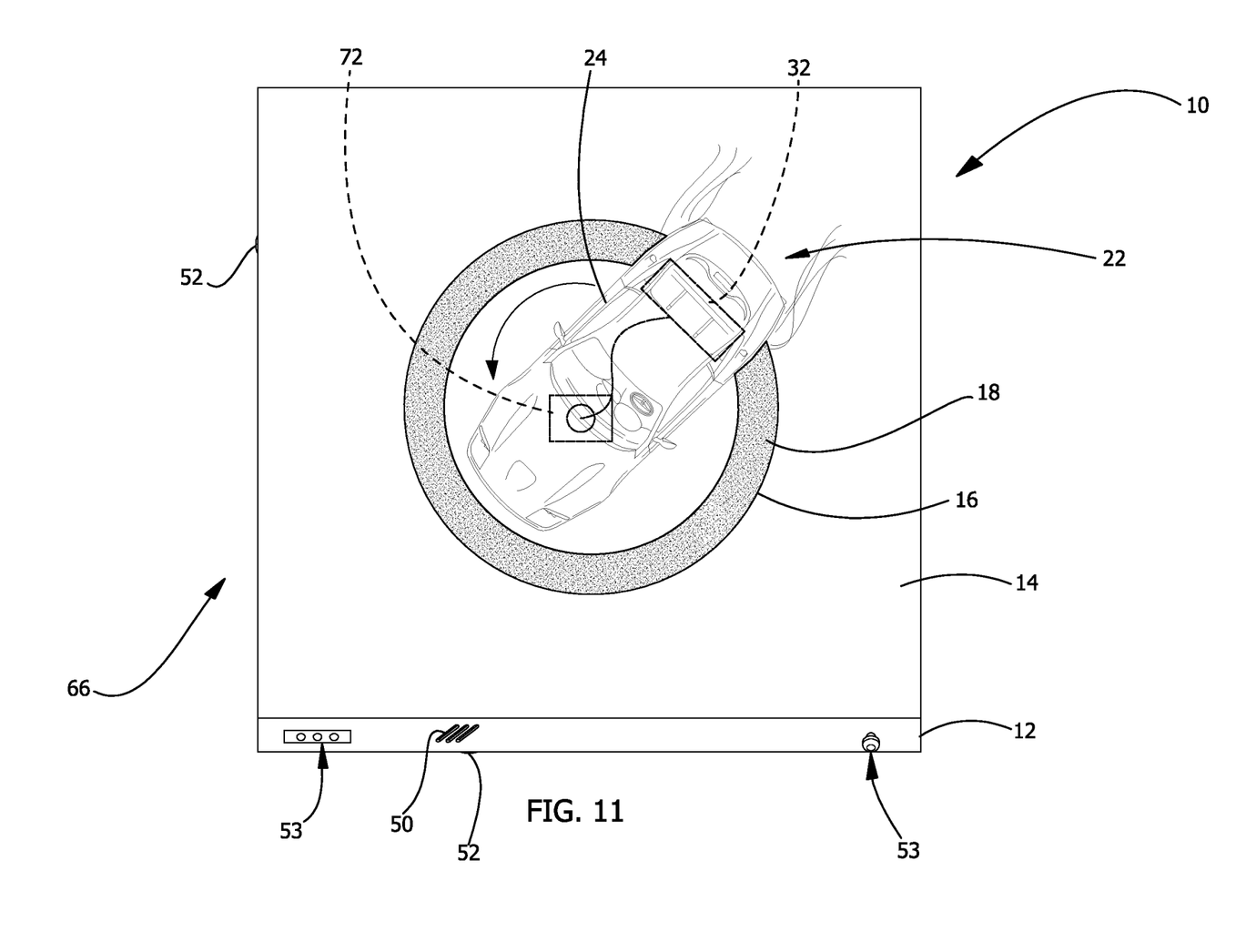
FIG. 11 is a top view of an embodiment of the disclosure.

Referring to FIGS. 1, 10, and 11, a second embodiment 66 of the toy vehicle apparatus 10 is depicted in which a rotation motor 72 is mounted to the base 12. The rotation motor 72 is operatively coupled to the processor 48. The rotation motor 72 of the second embodiment 66 is operable to urge the vehicle model 22 to rotate atop the base 12 when the rotation motor 72 is activated. The burnout panel 16 of the second embodiment 66 is positioned such that the pair of rear wheels 28 continually lie on the burnout panel 16 when the vehicle model 22 rotates atop the base 12. The burnout panel 16 has a circular shape but may have any shape which allows the vehicle model 22 to rotate as described.

Figure 12:
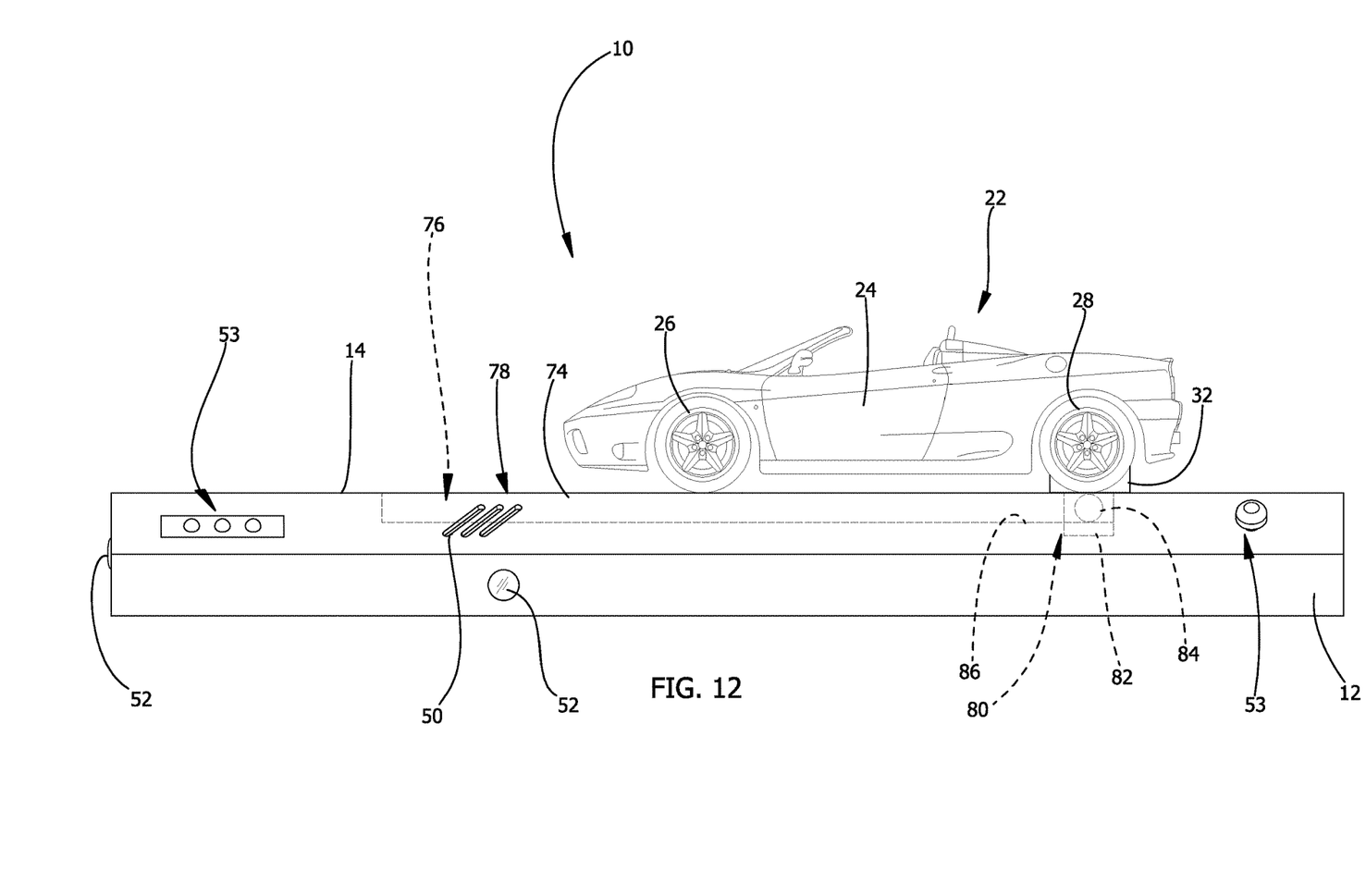
FIG. 12 is a side view of an embodiment of the disclosure.
Figure 13:
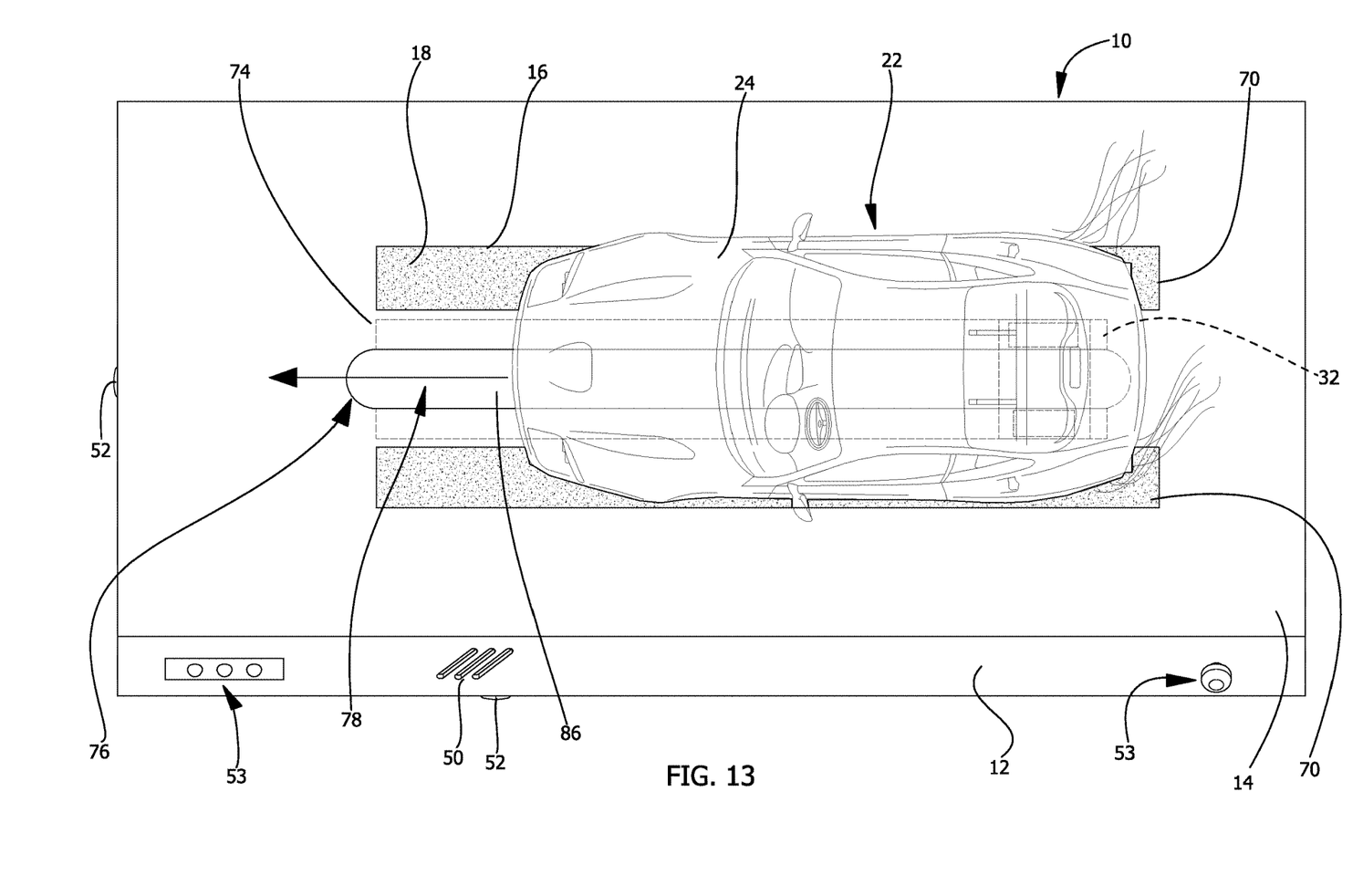
FIG. 13 is a top view of an embodiment of the disclosure.

Referring to FIGS. 1, 12, and 13, a third embodiment 68 of the toy vehicle apparatus 10 is depicted in which a track 74 is mounted to the top surface 14 of the base 12. The track 74 defines a channel 76 which extends along the top surface 14 of the base 12, and a top side 78 of the channel 76 is open. A drive 80 is coupled to the vehicle model 22 and is operatively coupled to the processor 48. The drive 80 is operable to urge the vehicle model 22 to move along the track 74. The drive 80 comprises a drive motor 82 and a pair of drive wheels 84, wherein the drive motor 82 is operatively coupled to the pair of drive wheels 84 and the pair of drive wheels 84 frictionally engage an interior surface 86 of the track 74. The burnout panel 16 comprises a pair of spaced portions 70. Each rear wheel 28 of the pair of rear wheels 28 lies on an associated spaced portion 70 of the pair of spaced portions 70. The spaced portions 70 are positioned opposite each other across the track 74 and extend parallel to the track 74.

In use, the toy vehicle apparatus 10 is operated in a burnout function similar to burnouts performed in road vehicles. To perform the burnout function, the wheel motor 32 is operated to urge the rear wheels 28 to rotate and abrade against the burnout panel 16, causing particulates of the abradable material of the rear wheels 28 to emit from rear wheels 28. The particulates may simulate smoke or may degrade such that actual smoke particles form. During the burnout function, the vehicle model 22 may remain stationary or may move with respect to the base 12 depending on the embodiment. For example, in the second embodiment 66, the vehicle model 22 may be urged to rotate atop the base 12 via the rotation motor 72 during the burnout function to simulate similar rotating movements performed in road vehicles during burnouts. Also, the vehicle model 22 as depicted in the third embodiment 68 may be urged to accelerate forwardly via the drive 80 during the burnout function to simulate a road vehicle accelerating from a stationary position after a burnout. The vehicle model 22 may move with respect to the base 12 in any of a variety of movements during the burnout function.

The burnout function may be actuated by the input 53, the remote electronic device 56, or a motion detected by the pair of motion sensors 52. The speaker 50 may emit audio including, for example, engine noises, sounds of tires abrading against a roadway, and the like. The plurality of light sources 36 may also be activated. The speaker 50 and the plurality of light sources 36 may be operated independently or as part of the burnout function.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A toy vehicle apparatus for performing a burnout function, the toy vehicle apparatus comprising:
   a base;
   a burnout panel being mounted to a top surface of the base, the burnout panel comprising an abrasive material; and
   a vehicle model being mounted over the base, the vehicle model comprising:
     a body;
     a pair of rear wheels being mounted to a bottom of the body, the wheel being rotatable with respect to the body, the pair of rear wheels lying on the burnout panel; and
     a wheel motor being operatively coupled to the wheel, the wheel motor being operable to rotate the wheel with respect to the body such that an outer surface of the wheel is abraded against the burnout panel, the pair of rear wheels comprising an abradable material such that particulates of the abradable material are urged away from the pair of rear wheels when the wheel motor causes the pair of rear wheels to abrade against the burnout panel; and
   a processor being mounted in the base and being operatively coupled to the wheel motor.

2. The apparatus of claim 1, wherein an upper surface of the burnout panel having a visual appearance such that the burnout panel simulates a pavement material.

3. The apparatus of claim 1, wherein the burnout panel is removable from the base.

4. The apparatus of claim 1, wherein the abradable material comprises rubber.

5. The apparatus of claim 1, wherein the vehicle model further comprises a plurality of light sources being mounted to the body, the processor being operatively coupled to the plurality of light sources.

6. The apparatus of claim 1, wherein the vehicle model further comprises:
   an axle being mounted to the body, the pair of rear wheels being removably mounted to the body via the axle; and
   a pair of connectors, each connector of the pair of connectors releasably coupling an associated rear wheel of the pair of rear wheels to the axle, each connector of the pair of connectors being positioned between the associated rear wheel and the axle, each connector of the pair of connectors engaging the associated rear wheel and the axle via friction fits.

7. The apparatus of claim 6, wherein the vehicle model further comprises a pair of retaining caps, each retaining cap of the pair of retaining caps being removably mounted around the axle near an associated end of a pair of ends of the axle, each retaining cap of the pair of retaining caps obstructing an associated rear wheel of the pair of rear wheels from being moved off of the axle past the associated end of the axle.

8. The apparatus of claim 1, further comprising a speaker being operatively coupled to the processor and being mounted to the base.

9. The apparatus of claim 1, further comprising a motion sensor being operatively coupled to the processor and being mounted to the base, the motion sensor being configured to detect motion, the processor being programmed to activate the wheel motor when the motion sensor detects motion.

10. The apparatus of claim 1, further comprising an input being operatively coupled to the processor and being mounted to the base.

11. The apparatus of claim 1, further comprising a transceiver being operatively coupled to the processor, the transceiver being configured to be in wireless communication with a remote electronic device such that the processor is operable by the remote electronic device.

12. The toy vehicle apparatus of claim 1, wherein the burnout panel comprises a pair of spaced portions, each rear wheel of the pair of rear wheels lying on an associated spaced portion of the pair of spaced portions.

13. The toy vehicle apparatus of claim 12, further comprising:
   a track being mounted to the top surface of the base; and
   a drive being coupled to the vehicle model, the drive being operatively coupled to the processor, the drive being operable to urge the vehicle model to move along the track;
   wherein the spaced portion of the pair of spaced portions are positioned opposite each other across the track and extend parallel to the track.

14. The toy vehicle apparatus of claim 1, further comprising:
   a rotation motor being mounted to the base, the rotation motor being operatively coupled to the processor, the rotation motor being operatively coupled to the vehicle model such that the rotation motor urges the vehicle model to rotate atop the base when the rotation motor is activated;

wherein the burnout panel is positioned such that the pair of rear wheels continually lie on the burnout panel when the vehicle model rotates atop the base.

15. The toy vehicle apparatus of claim 14, wherein the burnout panel has a circular shape.

16. A toy vehicle apparatus for performing a burnout function, the toy vehicle apparatus comprising:
a base;
a burnout panel being mounted to a top surface of the base, the burnout panel comprising an abrasive material, an upper surface of the burnout panel having a visual appearance such that the burnout panel simulates a pavement material, the burnout panel being removable from the base;
a vehicle model being mounted over the base, the vehicle model comprising:
a body;
a pair of front wheels being mounted to a bottom of the body;
a pair of rear wheels being mounted to the bottom of the body, the pair of rear wheels being rotatable with respect to the body, the pair of rear wheels lying on the burnout panel;
a wheel motor being operatively coupled to the pair of rear wheels, the wheel motor being operable to rotate the pair of rear wheels with respect to the body such that an outer surface of each rear wheel of the pair of rear wheels is abraded against the burnout panel, the pair of rear wheels comprising an abradable material such that particulates of the abradable material are urged away from the pair of rear wheels when the wheel motor causes the pair of rear wheels to abrade against the burnout panel, the abradable material comprising rubber;
a plurality of light sources being mounted to the body, each light source of the plurality of light sources being positioned on an associated one of a front side and a rear side of the body;
an axle being mounted to the body, the pair of rear wheels being removably mounted to the body via the axle;
a pair of connectors, each connector of the pair of connectors releasably coupling an associated rear wheel of the pair of rear wheels to the axle, each connector of the pair of connectors being positioned between the associated rear wheel and the axle, each connector of the pair of connectors engaging the associated rear wheel and the axle via friction fits; and
a pair of retaining caps, each retaining cap of the pair of retaining caps being removably mounted around the axle near an associated end of a pair of ends of the axle, each retaining cap of the pair of retaining caps obstructing an associated rear wheel of the pair of rear wheels from being moved off of the axle past the associated end of the axle;
a processor being mounted in the base and being operatively coupled to the wheel motor, the processor being operatively coupled to the plurality of light sources;

a speaker being operatively coupled to the processor and being mounted to the base;
a pair of motion sensors being operatively coupled to the processor and being mounted to the base, the pair of motion sensors being configured to detect motion, the pair of motion sensors facing in directions perpendicular to each other, the processor being programmed to activate the wheel motor when one motion sensor of the pair of motion sensors detects motion;
an input being operatively coupled to the processor and being mounted to the base, the input being actuatable to activate the wheel motor, the input being actuatable to alternately activate and deactivate the pair of motion sensors, the input being actuatable to alternately activate and deactivate the processor;
a transceiver being operatively coupled to the processor, the transceiver being configured to be in wireless communication with a remote electronic device such that the processor is operable by the remote electronic device;
a power supply being electrically coupled to the processor, the power supply comprising a battery; and
a charging port being mounted to the base and being electrically coupled to the battery, the charging port being configured to couple to an external power source via a power cord to charge the battery.

17. The toy vehicle apparatus of claim 16, wherein the burnout panel comprises a pair of spaced portions, each rear wheel of the pair of rear wheels lying on an associated spaced portion of the pair of spaced portions.

18. The toy vehicle apparatus of claim 16, further comprising:
a rotation motor being mounted to the base, the rotation motor being operatively coupled to the processor, the rotation motor being operatively coupled to the vehicle model such that the rotation motor urges the vehicle model to rotate atop the base when the rotation motor is activated;
wherein the burnout panel is positioned such that the pair of rear wheels continually lie on the burnout panel when the vehicle model rotates atop the base, the burnout panel having a circular shape.

19. The toy vehicle apparatus of claim 16, further comprising:
a track being mounted to the top surface of the base, the track defining a channel which extends along the top surface of the base, a top side of the channel being open;
a drive being coupled to the vehicle model, the drive being operatively coupled to the processor, the drive being operable to urge the vehicle model to move along the track, the drive comprising a drive motor and a pair of drive wheels, the drive motor being operatively coupled to the pair of drive wheels, the pair of drive wheels frictionally engaging an interior surface of the track;
wherein the burnout panel comprises a pair of spaced portions, each rear wheel of the pair of rear wheels lying on an associated spaced portion of the pair of spaced portions, the pair of spaced portions being positioned opposite each other across the track and extending parallel to the track.

* * * * *